United States Patent
Belshan et al.

(10) Patent No.: US 9,248,854 B2
(45) Date of Patent: Feb. 2, 2016

(54) ELECTRO-HYDRAULIC STEERING CONTROL SYSTEM

(71) Applicant: Caterpillar Inc., Peoria, IL (US)

(72) Inventors: Daryl James Belshan, Plainfield, IL (US); Beau Daniel Kuipers, Morris, IL (US); Edward William Mate, Manhattan, IL (US); Gene Richard St. Germain, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 483 days.

(21) Appl. No.: 13/856,733

(22) Filed: Apr. 4, 2013

(65) Prior Publication Data

US 2014/0298798 A1 Oct. 9, 2014

(51) Int. Cl.

| | |
|---|---|
| *F16D 31/02* | (2006.01) |
| *B62D 5/06* | (2006.01) |
| *F15B 9/08* | (2006.01) |
| *F15B 20/00* | (2006.01) |
| *B62D 5/32* | (2006.01) |
| *B62D 5/09* | (2006.01) |
| *B62D 5/30* | (2006.01) |

(52) U.S. Cl.
CPC .. *B62D 5/06* (2013.01); *B62D 5/09* (2013.01); *B62D 5/30* (2013.01); *B62D 5/32* (2013.01); *F15B 9/08* (2013.01); *F15B 20/00* (2013.01)

(58) Field of Classification Search
CPC ............. B62D 5/32; F15B 9/08; F15B 20/00; F15B 20/008
USPC .......................................................... 60/459
See application file for complete search history.

(56) References Cited

U.S. PATENT DOCUMENTS

| | | | | |
|---|---|---|---|---|
| 4,023,363 | A * | 5/1977 | Liebert | B62D 12/00 60/385 |
| 4,736,811 | A * | 4/1988 | Marsden | B62D 5/32 180/406 |
| 5,934,406 | A * | 8/1999 | Dvorak | B62D 5/09 180/403 |
| 6,655,492 | B2 | 12/2003 | Juul et al. | |
| 6,684,975 | B2 | 2/2004 | Rudolph | |
| 6,712,176 | B2 | 3/2004 | Zenker et al. | |
| 7,152,401 | B2 | 12/2006 | Soerensen | |
| 7,185,730 | B2 | 3/2007 | Schmidt et al. | |
| 7,610,988 | B2 | 11/2009 | Porskrog et al. | |
| 7,631,590 | B2 | 12/2009 | Thomsen et al. | |
| 7,770,687 | B2 | 8/2010 | Entwistle et al. | |
| 7,980,354 | B2 | 7/2011 | Thomsen et al. | |
| 7,997,378 | B2 | 8/2011 | Porskrog et al. | |
| 7,997,379 | B2 | 8/2011 | Kryhlmand et al. | |
| 8,079,439 | B2 | 12/2011 | Porskrog et al. | |
| 2007/0012731 | A1 | 1/2007 | Tseng | |
| 2007/0251755 | A1 | 11/2007 | Entwistle et al. | |
| 2011/0308882 | A1 | 12/2011 | Tamura et al. | |

* cited by examiner

*Primary Examiner* — Edward Look
*Assistant Examiner* — Daniel Collins
(74) *Attorney, Agent, or Firm* — Miller, Matthias & Hull LLP

(57) ABSTRACT

A steering control system includes a steering circuit, a primary control circuit and a redundant control circuit. The primary control circuit includes primary proportional control valves, and a primary pilot valve having a thermal bleed of pilot fluid to warm the primary pilot valve when not operating to control the steering circuit. The redundant control circuit includes secondary proportional control valves, and a pressure reducing valve having a thermal bleed orifice allowing fluid flow to warm the pressure reducing valve when not operating to control the steering circuit. The thermal bleeds may also flow past the proportional control valves to raise their temperatures. The circuits of the steering control system are contained in a single valve group housing.

19 Claims, 3 Drawing Sheets

ELECTRO-HYDRAULIC STEERING CONTROL SYSTEM

TECHNICAL FIELD

This disclosure relates generally to steering control systems and, in particular, to an improved electro-hydraulic steering control system for excavation machines contained within a single valve group housing and having improved warm-up and cold start up performance.

BACKGROUND

Electronic and electro-hydraulic steering control systems are currently implemented in vehicle steering systems to take advantage of their versatility over mechanical and hydraulic steering systems. Such control systems commonly use hydraulic power as the muscle for the actual steering function and electrical components as the command for the precision control of the hydraulic components. These control systems are particularly advantageous in excavating machines where the hydraulic power is necessary to move the steering components of the machine. In the event of performance issues or failure of the primary electronic or electro-hydraulic steering control system, a redundant control system is typically implemented in concert with the primary system to take over control of the steering components when necessary.

One such steering control system is disclosed in U.S. Pat. No. 4,736,811 issued to Marsden et al. on Apr. 12, 1988. The steering control system for lightweight vehicles is electronically controlled in its primary operation, and has a manually operated mechanical control as a backup to the electronic controls. The steering control system includes an electrically controlled circuit actuated by rotation of a steering wheel for controlling a main pilot operated steering valve as the primary steering control. A hydraulic control circuit is also actuated by rotation of the steering wheel for controlling the same steering valve as a backup control when the electrically controlled circuit is disabled or otherwise not active. The hydraulic steering circuit is disabled when the electrically controlled circuit is activated. The same steering valve is an integral part of both control circuits.

Another example of a steering control system is disclosed in U.S. Pat. No. 6,712,176 issued to Zenker et al. on Mar. 30, 2004. The reference patent discloses a hydraulic dual circuit steering system with a first circuit having a first control unit and a first steering motor connected with the control unit via working connections, a second circuit having a second control unit and a second steering motor connected with the control unit via working connections, and a changeover valve. The changeover valve activates the first circuit and deactivates the second circuit when the valve is in a first position, and activates the second circuit and deactivates the first circuit when the valve is in a second position. To purportedly improve the steering behavior, the working connections of the second circuit are connected with a pressure source when the changeover valve is in the first position, and the working connections of the first circuit are connected with a pressure source when of the changeover valve is in the second position.

In previously known steering control systems having redundant or backup control circuits, the components of the primary control circuit are provided as a first valve group contained within a first housing, and the components of the redundant control circuit are provided as a second valve group within a second housing. The first and second housings combine to have a significant amount of weight that must be moved by the engine along with the other components and systems of the machine, and claim a significant amount of space within the engine compartment or other compartment within which the steering control system is housed. Moreover, the first and second housings are placed in fluid communication by attaching external hoses there between to transfer steering and/or pilot fluids between the housings so that either the primary or the redundant control circuit can control the operation of the steering components. The points of attachment of the external hoses to the housings create potential leak points in addition to leaks that may develop along the hoses.

In either the primary or the redundant control circuits, fluid flow through the steering control system does not occur when the machine is not being steered by the operator, even when the engine and fluid pumps are running. At startup, pilot valves of the steering control system are typically biased to closed positions where fluid flow through the pilot valves to the steering valve is prevented. While other fluids are circulating in the hydraulic systems of the machine and warming up prior to operation of the machine, the fluids in the steering control system remain stagnant and do not warm up. At cooler temperatures, the fluids in the steering control system may be more resistant to flow, resulting in decreased responsiveness when the operator begins to drive the machine and command the steering control system to move the steering components of the machine. While the primary control circuit operates, the fluids in the redundant control circuit remain stagnant such that the same issues of system responsiveness may be present when steering control is transferred from the primary control circuit to the redundant control circuit.

In view of this, a need exists for an improved electro-hydraulic steering control system providing reduced weight, space claim and leak points. A need further exists for a steering control system having improved fluid circulation when steering of the machine is not being performed, and correspondingly improved responsiveness during cold startup and redundant system cutover.

SUMMARY OF THE DISCLOSURE

In one aspect of the present disclosure, a steering control system for a machine having components configured to turn in a first direction and a second direction is disclosed. The machine may also include a steering actuator operatively coupled to the steering components to turn in the first direction and the second direction, a steering input device, a steering fluid source and a pilot fluid source. The steering control system may include a steering circuit having a steering valve in fluid communication with the steering fluid source and movable between a closed position, a first open position wherein the steering valve outputs steering fluid to the steering actuator to cause the steering components to turn in the first direction, and a second open position wherein the steering valve outputs steering fluid to the steering actuator to cause the steering components to turn in the second direction. The steering control system may further include a primary control circuit in fluid communication with the steering circuit and configured to transmit pilot fluid to the steering valve to cause the steering valve to move between the closed position, the first open position and the second open position. The primary control circuit may include a primary pilot valve in fluid communication with the pilot fluid source and movable between a closed position that prevents transmission of pilot fluid to the steering circuit and an open position that allows transmission of pilot fluid to the steering circuit. The primary pilot valve may include a primary thermal bleed path allowing pilot fluid to flow through the primary pilot valve and output to a pilot fluid drain line when the primary pilot valve is in the closed position.

In another aspect of the present disclosure, a steering control system for a machine having steering components configured to turn in a first direction and a second direction is disclosed. The machine may also include a steering actuator operatively coupled to the steering components to turn in the first direction and the second direction, a steering input device, a steering fluid source and a pilot fluid source. The steering control system may include a steering circuit in fluid communication with the steering fluid source and operable to one of prevent steering fluid from the steering fluid source from being transmitted to the steering actuator, output steering fluid to the steering actuator to cause the steering components to turn in the first direction, and output steering fluid to the steering actuator to cause the steering components to turn in the second direction. The steering control system may also include a primary control circuit and a redundant control circuit. The primary control circuit may be in fluid communication with the pilot fluid source and operable to one of prevent pilot fluid from the pilot fluid source from being transmitted to the steering circuit, output pilot fluid to the steering circuit to cause the steering circuit to output steering fluid to the steering actuator to cause the steering components to turn in the first direction, and output pilot fluid to the steering circuit to cause the steering circuit to output steering fluid to the steering actuator to cause the steering components to turn in the second direction. The redundant control circuit may be in fluid communication with the steering fluid source and operable to one of prevent steering fluid from the steering fluid source from being transmitted to the steering circuit, output steering fluid to the steering circuit to cause the steering circuit to output steering fluid to the steering actuator to cause the steering components to turn in the first direction, and output steering fluid to the steering circuit to cause the steering circuit to output steering fluid to the steering actuator to cause the steering components to turn in the second direction. The steering control system may also include a valve group housing enclosing the steering circuit, the primary control circuit and the redundant control circuit, wherein the valve group housing includes interior surfaces defining passages therein for communicating pilot fluid and steering fluid between the steering circuit, the primary control circuit and the redundant control circuit.

In a further aspect of the present disclosure, a steering control system for a machine having a steering circuit in fluid communication with a steering fluid source and operable to output steering fluid to a steering actuator of the machine to cause the steering components of the machine to turn in first and second directions. The steering control system may include a primary control circuit in fluid communication with a pilot fluid source and operable to output pilot fluid to the steering circuit to cause the steering circuit to output steering fluid to the steering actuator to cause the steering components to turn in the first direction and the second direction, and a redundant control circuit in fluid communication with the steering fluid source and operable to output steering fluid to the steering circuit to cause the steering circuit to output steering fluid to the steering actuator to cause the steering components to turn in the first direction and the second direction. The improvement in the steering control system may include a valve group housing enclosing the steering circuit, the primary control circuit and the redundant control circuit, wherein the valve group housing includes interior surfaces defining passages therein for communicating pilot fluid and steering fluid between the steering circuit, the primary control circuit and the redundant control circuit.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1:
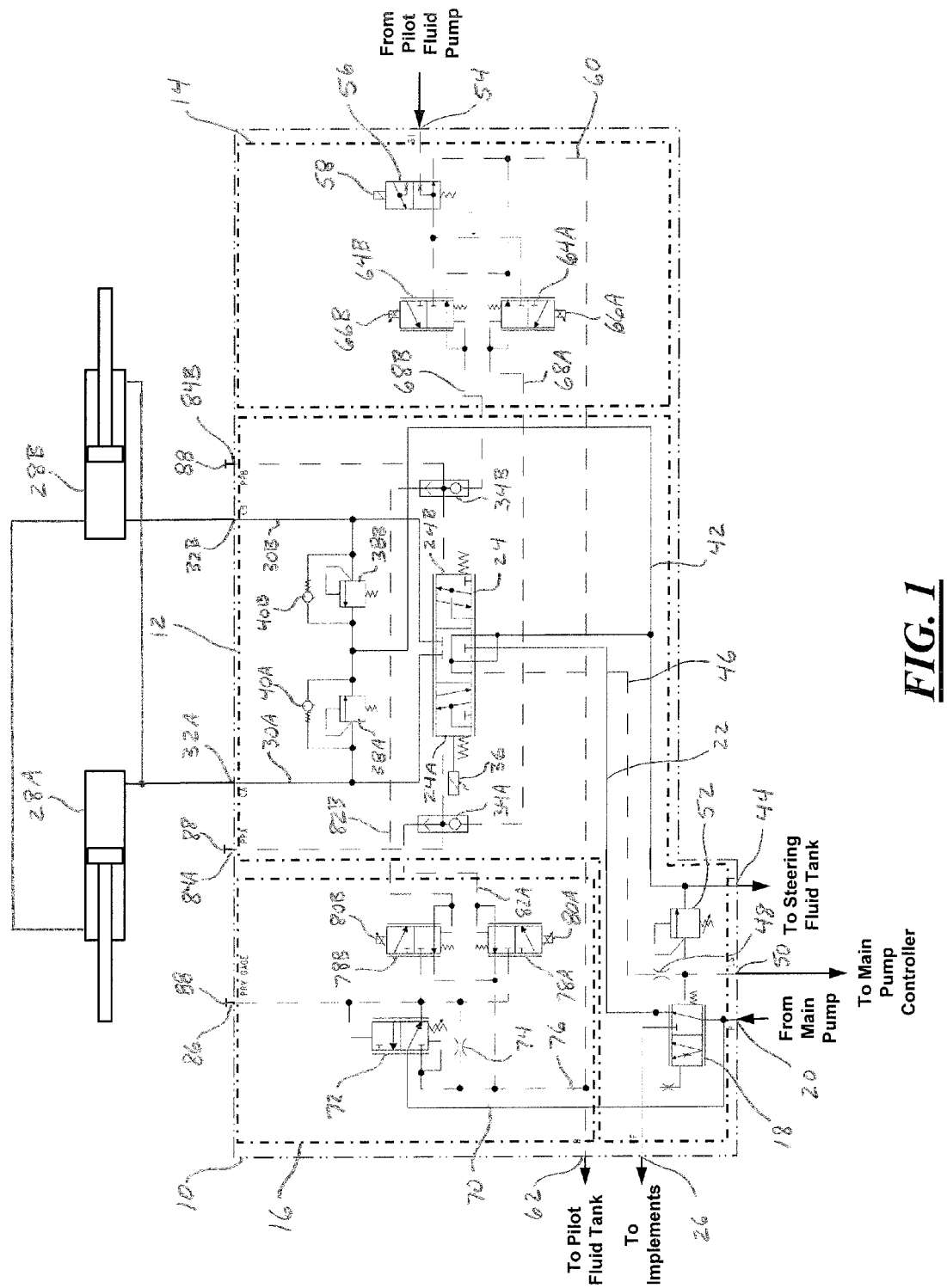
FIG. 1 is a schematic view of an embodiment of an electro-hydraulic steering control system in accordance with the present disclosure.

FIG. 1 illustrates an electro-hydraulic steering control system 10 of an excavating machine that may include a steering circuit 12, an electrically controlled primary control circuit 14, and a hydraulic redundant control circuit 16. The steering circuit 12 may include a priority valve 18 in fluid communication with a main supply port 20 to receive pressurized steering fluid from a main pump (not shown). The priority valve 18 outputs the pressurized steering fluid via a steering fluid supply line 22 to a pilot operated steering valve 24. The priority valve 18 may include a secondary output in fluid communication with an excess flow port 26 to output excess steering fluid to implements (not shown) of the excavating machine after the necessary volume of steering fluid is provided to the steering circuit 12. The priority valve 18 may sense the outlet pressure of the priority valve 18 in the steering fluid supply line 22 and open to divert the excess steering fluid to the implements when the outlet pressure exceeds a specified steering fluid pressure.

The steering valve 24 is spring biased to a neutral position as shown at which communication of steering fluid to and from a steering actuator or actuators is blocked. The steering control system 10 may be used to control any appropriate type of hydraulic actuator(s) used for turning wheels (not shown) of the excavating machine in a first direction A and a second direction B. In the illustrated embodiment, for example, appropriate first inlets of a first steering cylinder 28A and a second steering cylinder 28B for turning the wheels in the first direction A are placed in fluid communication with the steering valve 24 by a first cylinder supply line 30A and a first steering fluid outlet port 32A, and second inlets of the steering cylinder 28A, 28B for turning the wheels in the second direction B are placed in fluid communication with the steering valve 24 by a second cylinder supply line 30B and a second steering fluid outlet port 32B. The steering valve 24 is movable to the right as shown in FIG. 1 to a position at which pressurized steering fluid from the priority valve 18 is directed through the first cylinder supply line 30A to the first inlets of the steering cylinders 28A, 28B to turn the wheels in the first direction A. Similarly, moving the steering valve 24 to the left directs pressurized steering fluid from the priority valve 18 through the second cylinder supply line 30B to the second inlets of the steering cylinders 28A, 28B to turn the wheels in the second direction B. Movement of the steering valve 24 is controlled by the control circuits 14, 16 via pilot fluid that is communicated through a first resolver shuttle valve 34A to a first end 24A of the steering valve 24, and communicated through a second resolver shuttle valve 34B to a second end 24B of the steering valve 24 as discussed more fully below. The position of the steering valve 24 is monitored by a spool position sensor 36 operatively connected thereto.

During operation of the excavating machine, the wheels of the machine may be subjected to impacts causing the wheels to sharply turn in one of the directions A or B. The sharp turning of the wheels causes one side of the steering cylinders 28A, 28B to compress and increase the pressure in the corresponding cylinder supply line 30A, 30B, while the other sides of the steering cylinders 28A, 28B undergo an expansion stroke and decreases the pressure in the corresponding cylinder supply line 30A, 30B. To relieve the pressure and prevent cavitation in the expanding sides of the steering cylinders 28A, 28B during impact situations, the steering circuit 12 includes a first shock valve 38A and a first anti-cavitation check valve 40A connecting the first cylinder supply line 30A to a steering fluid drain line 42, and a second shock valve 38B and a second anti-cavitation check valve 40B connecting the second cylinder supply line 30B to the steering fluid drain line 42. The steering fluid drain line 42 is connected at an opposite end to a steering fluid drain port 44 to drain the steering fluid to a steering fluid tank.

When an impact causes the wheels to turn sharply in the second direction B, for example, the first sides of the steering cylinders 28A, 28B may compress and increase the pressure in the first cylinder supply line 30A, and the second sides of the steering cylinders 28A, 28B may undergo expansion and decrease the pressure in the second cylinder supply line 30B. After a predetermined line pressure is reached in the first cylinder supply line 30A, the first shock valve 38A opens to vent steering fluid from the first cylinder supply line 30A to the steering fluid drain line 42 and relieve the pressure in the first cylinder supply line 30A. At the same time, the pressure of the steering fluid exiting the first shock valve 38A forces the second anti-cavitation check valve 40B to open to allow steering fluid to flow through the second cylinder supply line 30B and into the second sides of the steering cylinders 28A, 28B to fill the second sides of the steering cylinders 28A, 28B and prevent cavitation therein. In a similar manner for impacts causing the wheels to turn sharply in the first direction A, the second shock valve 38B opens to vent steering fluid from the second cylinder supply line 30B to the steering fluid drain line 42 and the first anti-cavitation check valve 40A opens to provide steering fluid to fill the expanding cavities of the first sides of the steering cylinders 28A, 28B.

During operation of the steering circuit 12, the pressure of the steering fluid is monitored and adjusted as necessary to ensure that a sufficient operating pressure is maintained for turning the wheels. Steering valve 24 provides a pressure output of steering fluid on a load sense signal line 46 as the steering valve 24 moves between the illustrated neutral position and its operative positions. The steering fluid in the load sense signal line 46 passes through a load sense orifice 48 and to a load sense outlet port 50 to communicate the steering fluid to a controller (not shown) of the main pump. The main pump controller senses the steering fluid pressure and adjusts the main pump as necessary to increase or decrease the output of steering fluid to the priority valve 18 to maintain a specified steering fluid pressure. A load sense relief valve 52 may be installed between the load sense signal line 46 and the steering fluid drain line 42 to vent steering fluid to the steering fluid tank if the steering fluid pressure in the steering circuit 12 exceeds a predetermined maximum steering fluid pressure.

The primary control circuit 14 receives pressurized pilot fluid from a pilot fluid pump (not shown) at a pilot fluid supply port 54, and the pilot fluid is communicated to a solenoid actuated primary pilot on/off valve 56. The primary pilot valve 56 is biased to a normally closed position, and its position is controlled by a valve actuator 58. In both the closed and open positions, the inlet of the primary pilot valve 56 is in fluid communication with an outlet to a pilot fluid drain line 60 so that a portion of the pilot fluid from the pilot fluid supply port 54 circulates through the primary pilot valve 56 and bleeds out through the pilot fluid drain line 60 to a pilot fluid drain port 62. The thermal bleed in which the pilot fluid flows through the primary pilot valve 56 begins when the machine and the pilot fluid pump start up. The pilot fluid circulation increases the temperature of the pilot fluid available to the primary control circuit 14 when the operator begins driving the machine, thereby increasing the responsiveness of the steering circuit 12 after a cold start and during operation in cold environments.

An outlet of the primary pilot valve 56 is in fluid communication with inlets of a first primary proportional control valve 64A and a second primary proportional control valve 64B. The primary proportional control valves 64A, 64B are biased to closed positions and are solenoid actuated, with their positioning being controlled by corresponding valve actuators 66A, 66B, respectively. The primary proportional control valves 64A, 64B control the flow of the pilot fluid from the primary control circuit 14 to the steering valve 24 of the steering circuit 12 to cause the wheels to turn in either direction A, B. An outlet of the first primary proportional control valve 64A is placed in fluid communication with a first inlet of the first resolver shuttle valve 34A by a first pilot fluid supply line 68A, and an outlet of the second primary proportional control valve 64B is placed in fluid communication with a first inlet of the second resolver shuttle valve 34B by a second fluid supply line 68B. In the closed positions as shown, the primary proportional control valves 64A, 64B allow pilot fluid to drain from the pilot fluid supply lines 68A, 68B to the pilot fluid drain line 60 to relieve the pilot fluid pressure applied to the corresponding ends 24A, 24B of the steering valve 24. When one of the primary proportional control valves 64A, 64B is in the open position, the pilot fluid from the opened primary proportional control valve 64A, 64B causes the corresponding resolver shuttle valve 34A, 34B to open to a position that places the primary proportional control valve 64A, 64B in fluid communication with the corresponding end 24A, 24B of the steering valve 24 to move the steering valve 24 into position to cause the wheels to turn in a commanded direction A, B.

The hydraulic redundant control circuit 16 is operated to control steering of the machine by the steering circuit 12 in the event of a failure in the operation of the primary control circuit 14. The hydraulic redundant control circuit 16 receives pressurized steering fluid from the main pump that is diverted from the steering circuit 12 upstream of the priority valve 18 by a redundant control circuit supply line 70. The diverted steering fluid is communicated to an inlet of a pressure reducing valve (PRV) 72 of the redundant control circuit 16. The PRV 72 is biased to a normally open position, and the position of the PRV 72 is controlled by sensing the pressure of the steering fluid at an outlet of the PRV 72 to maintain a constant pressure pilot fluid supply within the redundant control circuit 16.

The outlet of the PRV 72 is in fluid communication with a thermal bleed orifice 74 that is connected to the pilot fluid drain line 60 by a steering fluid drain line 76. A portion of the steering fluid from the redundant control circuit supply line 70 circulates through the PRV 72 and bleeds out through the thermal bleed orifice 74 to the pilot fluid drain line 60. The steering fluid flow through the PRV 72 begins when the machine and the main pump start up, and the steering fluid circulation increases the temperature of the steering fluid available to the redundant control circuit 16 to maintain the responsiveness of the steering circuit 12 when the redundant control circuit 16 assumes control of the steering circuit 12 upon failure of the primary control circuit 14.

The outlet of the PRV 72 is in fluid communication with inlets of a first redundant proportional control valve 78A and a second redundant proportional control valve 78B. In a similar manner as the primary proportional control valves 64A, 64B, the redundant proportional control valves 78A, 78B are biased to their closed positions and are solenoid actuated, with their positioning being controlled by corresponding valve actuators 80A, 80B, respectively. The redundant proportional control valves 78A, 78B control the flow of the diverted steering fluid from the redundant control circuit 16 to the steering valve 24 of the steering circuit 12 to cause the wheels to turn in either direction A, B after the redundant control circuit 16 assumes control from the primary control circuit 14.

An outlet of the first redundant proportional control valve 78A is placed in fluid communication with a second inlet of the first resolver shuttle valve 34A by a first steering fluid supply line 82A, and an outlet of the second redundant proportional control valve 78B is placed in fluid communication with a second inlet of the second resolver shuttle valve 34B by a second steering supply line 82B. In the closed positions as shown, the redundant proportional control valves 78A, 78B allow steering fluid to drain from the steering fluid supply lines 82A, 82B through the steering fluid drain line 76 to the pilot fluid drain line 60 to relieve the steering fluid pressure applied to the corresponding ends 24A, 24B of the steering valve 24. When one of the redundant proportional control valves 78A, 78B is in the open position, the steering fluid from the opened redundant proportional control valve 78A, 78B causes the corresponding resolver shuttle valve 34A, 34B to open to a position that places the redundant proportional control valve 78A, 78B in fluid communication with the corresponding end 24A, 24B of the steering valve 24 to move the steering valve 24 into position to cause the wheels to turn in a commanded direction A, B.

Periodically after the electro-hydraulic steering control system 10 is installed, it may be desirable to directly measure the fluid pressure at various locations within the steering control system 10. Direct measurement of the fluid pressures may allow diagnostic testing to be performed on the steering control system 10 while it is operating to determine whether operational or maintenance issues exist. For example, it may be desirable to measure the pressure of the pilot fluid or the steering fluid being provided to the resolver shuttle valves 34A, 34B when the actual turning of the wheels does not match the commanded steering input of the operator. To measure these pressures, pilot pressure diagnostic ports 84A, 84B may be provided in fluid communication with the resolver shuttle valves 34A, 34B, respectively. It may also be desirable to directly measure the fluid pressure output by the PRV 72 and the redundant control circuit 16 to ensure the readiness of the redundant control circuit 16 to assume control from the primary control circuit 14. Consequently, a PRV diagnostic port 86 may be provided in fluid communication with the outlet of the PRV 72. During normal operation of the steering circuit 12 when diagnostics are not being performed, the diagnostic ports 84A, 84B, 86 may be sealed by caps 88 to prevent leakage.

Figure 2:
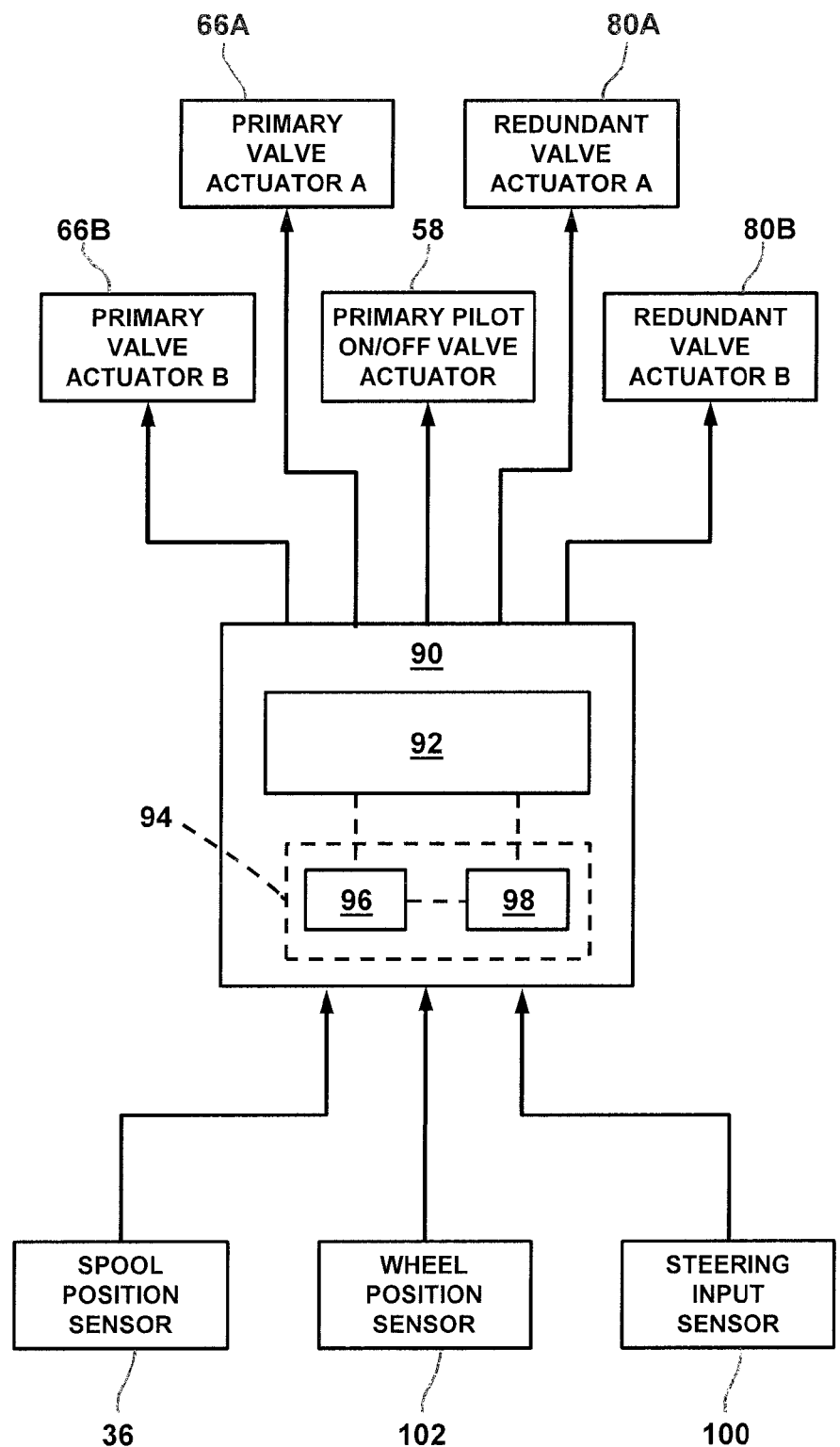
FIG. 2 is a schematic illustration of an exemplary electronic control unit and control components that may be implemented in the exemplary electro-hydraulic steering control system of FIG. 1.

The operation of the primary control circuit 14 and the redundant control circuit 16 may be monitored and controlled by a control unit of the machine. FIG. 2 illustrates one example of an electronic control module (ECM) 90 that may be implemented in the machine to control the control circuits 14, 16 and, if desired, other systems of the machine. The ECM 90 may include a microprocessor 92 for executing a specified program, which controls and monitors various functions associated with the machine in general and with the steering circuit 12 in particular. The microprocessor 92 includes a memory 94, such as ROM (read only memory) 96, for storing a program or programs, and a RAM (random access memory) 98 which serves as a working memory area for use in executing the program(s) stored in the memory 94. Although the microprocessor 92 is shown, it is also possible and contemplated to use other electronic components such as a microcontroller, an ASIC (application specific integrated circuit) chip, or any other integrated circuit device.

The ECM 90 electrically connects to the control elements of the steering control system 10 as well as various input devices for commanding the operation of the steering control system 10 and monitoring the performance of the steering control system 10. As a result, the ECM 90 is electrically connected to the valve actuators 58, 66A, 66B, 80A, 80B described above to transmit commands for opening and closing the corresponding valves 56, 64A, 64B, 78A, 78B, respectively. The ECM 90 is also electrically connected to an appropriate steering input sensor 100 that detects steering commands input by the operator at a steering input device of the machine, such as a steering wheel, joystick(s), a tiller and the like. Feedback on the real-time status of the steering control system 10 and the performance of the steering control system 10 may be provided by sensors measuring key parameters related to the operation of the steering control system 10, such as the spool position sensors 36 described above, a wheel position sensor 102 and the like, that are electrically connected to the ECM 90. The operation of the steering control system 10 under the control of the ECM 90 is described in greater detail below.

Figure 3:
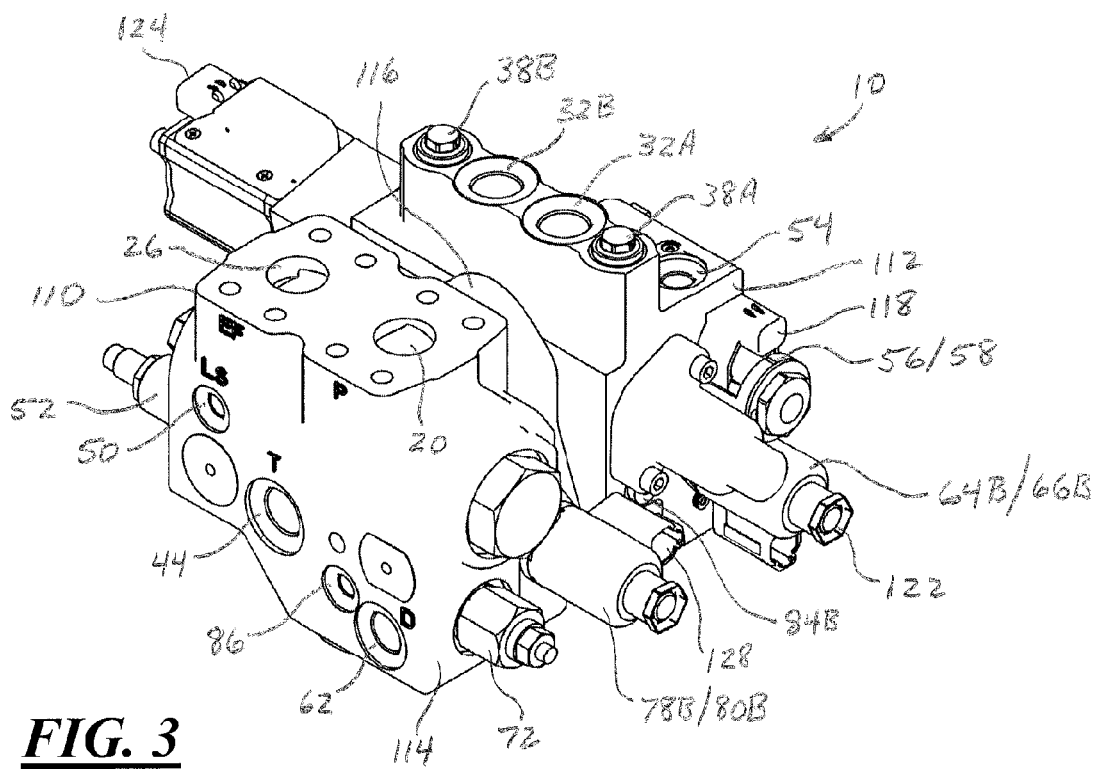
FIG. 3 is a first perspective view of an embodiment of a valve group housing for the exemplary electro-hydraulic steering control system of FIG. 1.
Figure 4:
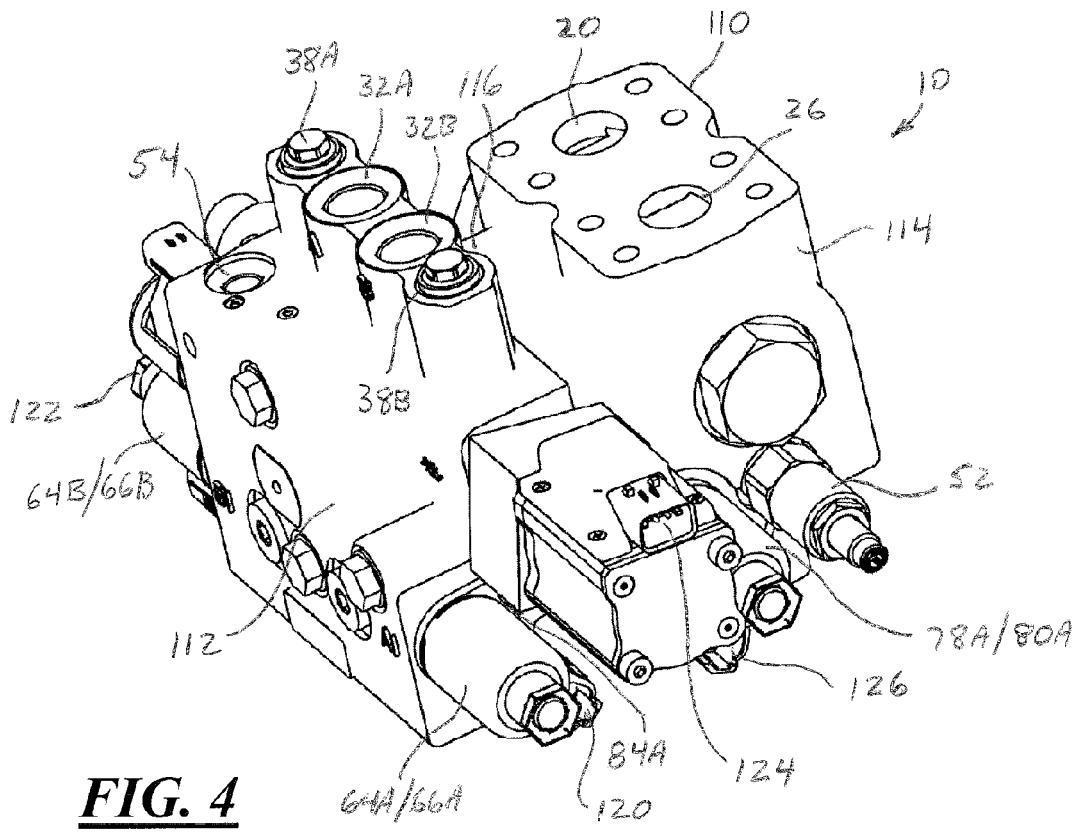
FIG. 4 is a second perspective view of the valve group housing of FIG. 3.

In contrast to previously known steering control circuits wherein primary and redundant control circuits are provided as separate valve groups enclosed in separate housings, the electro-hydraulic steering control system 10 in accordance with the present disclosure may be provided as a single valve group having a common housing. As shown in FIGS. 3 and 4, the steering control system 10 may be provided within a unitary valve group housing 110 within which is disposed the various elements of the steering circuit 12, the primary control circuit 14 and the redundant control circuit 16 described above. In the illustrated embodiment, the valve group housing 110 may include a primary housing portion 112 containing the elements of the primary control circuit 14, a redundant housing portion 114 containing the elements of the redundant control circuit 16, and an intermediate housing portion 116 providing passages for communicating steering fluid and pilot fluid between the housing portions 112, 114. The elements of the steering circuit 12 may be disposed in either of the housing portions 112, 114, or may be distributed between the housing portions 112, 114 as necessary for an efficient arrangement of the steering control system 10.

The valve group housing 110 as shown in FIGS. 3 and 4 is laid out in a similar manner as the schematic diagram of FIG. 1 in terms of the elements of the steering control system 10. The primary housing portion 112 contains the primary pilot valve 56 and the primary proportional control valves 64A, 64B of the primary control circuit 14, along with their corresponding valve actuators 58, 66A, 66B. The valves 56, 64A, 64B are mounted within corresponding openings through the exterior of the primary housing portion 112, and electrical connection terminals 118, 120, 122 for the valve actuators 58, 66A, 66B, respectively, are accessible for connection to the ECM 90 for transmission of control signals. An opening is provided for the pilot fluid supply port 54 for connection of a conduit from the pilot fluid pump to supply the pilot fluid to the primary control circuit 14. Within the valve group housing 110, internal surfaces define the various fluid flow lines illustrated and described above for transmitting steering fluid and pilot fluid between the elements of the steering control system 10. Consequently, such internal surfaces define passages connecting the pilot fluid supply port 54 to the primary pilot valve 56, and the primary pilot valve 56 to the primary proportional control valves 64A, 64B. Similarly, the pilot fluid supply lines 68A, 68B and a portion of the pilot fluid drain line 60 are defined within the primary housing portion 112.

Elements of the steering circuit 12 are also disposed within the primary housing portion 112. The steering valve 24, the resolver shuttle valves 34A, 34B and the anti-cavitation check valves 40A and 40B are contained within the primary housing portion 112. The shock valves 38A, 38B are installed within corresponding openings through the exterior of the primary housing portion 112, and may be adjustable if desired to set the steering fluid pressure at which the shock valves 38A, 38B will open as appropriate. The spool position sensor 36 may also be contained within the primary housing portion 112 and operatively connected to the steering valve 24. An external connection terminal 124 is provided for electrically connecting the spool position sensor 36 to the ECM 90 to provide feedback signals for the position of the steering valve 24. The primary housing portion 112 further provides external openings for the steering fluid outlet ports 32A, 32B for connection of conduits leading to the steering cylinders 28A, 28B, respectively, and for the pilot pressure diagnostic ports 84A, 84B for connection of caps 88 or diagnostic equipment as appropriate. Additional internal surfaces define the cylinder supply lines 30A, 30B, and the portions of the steering fluid supply lines 22, 82A, 82B, the steering fluid drain line 42, and the load sense signal line 46 within the primary housing portion 112.

The redundant housing portion 114 contains the remaining elements of the steering circuit 12 along with the elements of the redundant control circuit 16. From the steering circuit 12, the priority valve 18 is contained within the redundant housing portion 114, and the load sense relief valve 52 is installed within a corresponding opening through the exterior of the redundant housing portion 114. Access to the load sense relief valve 52 allows for adjustment of the predetermined maximum steering fluid pressure at which the load sense relief valve 52 will open to relieve pressure in the steering circuit 12. The remaining portions of the steering fluid supply line 22, the steering fluid drain line 42, and the load sense signal line 46, including the load sense orifice 48, are defined by surfaces within the redundant housing portion 114. The steering fluid drain line 42 and the load sense signal line 46 terminate at openings in the redundant housing portion 114 for the steering fluid drain port 44, and the load sense outlet port 50, respectively. Openings are also provided in the redundant housing portion 114 for the main supply port 20 and the excess flow port 26.

The entire redundant control circuit 16 may be contained within the redundant housing portion 114. Consequently, the PRV 72 and the redundant proportional control valves 78A, 78B, along with their corresponding valve actuators 80A, 80B, are installed within corresponding openings through the exterior of the redundant housing portion 116. Electrical connection terminals 126, 128 for the valve actuators 80A, 80B, respectively, are accessible for connection to the ECM 90 for transmission of control signals. An opening is provided for the pilot fluid drain port 62 for connection of a conduit to the pilot fluid tank to drain the fluid in the pilot fluid drain line 60 from the primary control circuit 14 and the steering fluid drain line 76, which includes the thermal bleed orifice 74, from the redundant control circuit 16. An opening is also provided for the PRV diagnostic port 86. Internal surfaces define the redundant control circuit supply line 70 connecting the main supply port 20 to the PRV 72, and portions of the steering fluid supply lines 82A, 82B providing fluid from the redundant control circuit 16 to the steering circuit 12 when the redundant control circuit 16 assumes control from the primary control circuit 14.

The intermediate housing portion 116 provides an interface between the primary housing portion 112 and the redundant housing portion 114 for fluid flowing between the housing portions 112, 114. Consequently, steering fluid in the steering fluid supply lines 22, 82A, 82B flows from the redundant housing portion 114 to the primary housing portion 112, and the steering fluid in the steering fluid drain line 42 and the load sense signal line 46, and pilot fluid in the pilot fluid drain line 60, flows from the primary housing portion 112 to the redundant housing portion 114. Though the valve group housing 110 as illustrated and described herein may be a unitary cast component of the machine, those skilled in the art will understand that one or more of the housing portions 112, 114, 116 may be fabricated separately to provide access to the interiors of the portions 112, 114, 116 for installation of various components of the steering control system 10 therein. When housing portions 112, 114, 116 are fabricated separately, the interior surfaces defining the fluid flow passages traversing the interface between the housing portions 112, 114, 116, such as the steering fluid supply line 22, are aligned for fluid to flow there between without leakage at the interface, and an appropriate seal, such as an O-ring seal, may be installed during assembly of the housing 110.

INDUSTRIAL APPLICABILITY

The electro-hydraulic steering control system 10 as described operates to manipulate the steering circuit 12 and the steering cylinders 28A, 28B using either the primary control circuit 14 or the redundant control circuit 16. Referring back to FIG. 1, the steering control system 10 is illustrated with the circuits 12, 14, 16 in neutral positions that may be default positions when no steering is occurring or when the wheels of the machine are in a position that matches a position commanded by the operator of the machine. In the steering circuit 12, the steering valve 24 is in a neutral position where pressurized steering fluid in the steering fluid supply line 22 is cut off from the cylinder supply line 30A, 30B. Depending on the pressure in the steering fluid supply line 22 and the pressure in the load sense signal line 46, the priority valve 18 communicates the steering fluid from the main pump to the steering fluid supply line 22, or diverts some of the steering fluid to the implements through the excess flow port 26. The neutral position of the steering valve 24 also causes steering fluid in the steering fluid drain line 42 to be communicated through the load sense signal line 46 and load sense orifice 48 to the load sense outlet port 50.

In the primary control circuit 14, the primary pilot valve 56 and the primary proportional control valves 64A, 64B are biased to their closed positions to prevent the flow of pilot fluid to the steering circuit 12. Even though pilot fluid does not flow through the valves 56, 64A, 64B, the thermal bleed of the primary pilot valve 56 allows pilot fluid to circulate through the valve 56 and out through the pilot fluid drain line 60 to ensure that warmed hydraulic fluid will flow through the primary control circuit 14 and increase the responsiveness of the primary control circuit 14 during cold start up and in cold operating environments. In addition, providing the primary pilot valve 56 allows the steering control system 10 to minimize unintended inputs by the operator that have the potential to subsequently drive an unintended steering input and turn the wheels.

The redundant control circuit 16 maintains its normal neutral position during startup and while the primary control circuit 14 is operative to control the steering circuit 12. The PRV 72 is biased to an open position to maintain a constant steering fluid pressure at the inlets of the redundant proportional control valves 78A, 78B. At the same time, the redundant proportional control valves 78A, 78B are biased to their closed positions to prevent the flow of steering fluid to the steering circuit 12. If the steering fluid pressure is too high, the PRV 72 operates to vent steering fluid to the steering fluid drain line 76 and reduce the steering fluid pressure at the valves 78A, 78B. While in the open position, circulation of steering fluid through the PRV 72 is maintained via the thermal bleed orifice 74 allowing flow of steering fluid to the steering fluid drain line 76. As with the thermal bleed of the primary pilot valve 56, the thermal bleed provided by the orifice 74 facilitates warm steering fluid being available in the redundant control circuit 16 when the redundant control circuit 16 assumes control from the primary control circuit 14. In the physical configuration of the redundant control circuit 16, the line for the thermal bleed orifice may be routed past the redundant proportional control valves 78A, 78B such that the steering fluid elevates the temperatures of the valves 78A, 78B when they are not operating. In alternative embodiments, an additional line or lines connecting the outlet of the PRV 72 to the steering fluid drain line 76 and/or the pilot fluid drain line 60 and having a thermal bleed orifice or orifices may allow steering fluid to flow past the valves 78A, 78B and warm the valves 78A, 78B when they are not operating to control the steering valve 24.

When the operator manipulates the steering controls to turn the wheels in the first direction A, the movement of the steering controls is detected by the steering input sensor 100 which in turn communicates steering input control signals to the ECM 90. The ECM 90 uses the steering input control signals from the steering input sensor 100 to determine the manner in which to operate the elements of the primary control circuit 14 to turn the machine as commanded by the operator. For example, the ECM 90 may determine the direction and magnitude of the steering command from the steering input control signals, and compare the direction and magnitude of the steering command to a current position of the wheels provided by the wheel position sensor 102 and a current position of the steering valve 24 provided by the spool position sensor 36. Based on the comparison, the ECM 90 determines an amount of steering fluid flow necessary to turn the wheels from the current position to the commanded position.

After making the determination of the amount of steering fluid flow, the ECM 90 transmits a control signal to the valve actuator 58 of the primary pilot valve 56 to move the valve 56 to the open or ON position to provide pilot fluid to the primary proportional control valves 64A, 64B. The ECM 90 also transmits control signals to the valve actuator 66A of the primary proportional control valve 64A to open the valve 64A and cause an output pressure of pilot fluid that is proportional to the amount of turn in the first direction A. As the valve 64A opens, pilot fluid is communicated over the pilot fluid supply line 68A to the resolver shuttle valve 34A. The pilot fluid causes the resolver shuttle valve 34A to open to a position that places the pilot fluid supply line 68A in fluid communication with the first end 24A of the steering valve 24. The pilot fluid causes the steering valve 24 to move and place the steering fluid supply line 22 in fluid communication with the first cylinder supply line 30A and steering fluid outlet port 32A. The steering fluid flows into the first steering cylinder 28A, causing the piston to move and cause the wheels to turn in the first direction A. At the same time, the steering valve 24 places the second cylinder supply line 30B in fluid communication with the steering fluid drain line 42 to drain fluid from the second steering cylinder 28B and allow the wheels to turn the first direction A.

When the operator manipulates the steering controls to turn the wheels in the opposite direction B, the ECM 90 determines an amount of steering fluid flow necessary to turn the wheels from the current position to the commanded position in a similar manner. To turn the wheels in the second direction B, the ECM 90 transmits the control signal to the valve actuator 58 to move the primary pilot valve 56 to the open or on position, and the ECM 90 also transmits control signals to the valve actuator 66B to open the primary proportional control valve 64B to cause an output pressure of pilot fluid that is proportional to the amount of turn in the second direction B. Pilot fluid from the valve 64B is communicated over the pilot fluid supply line 68B, and through the resolver shuttle valve 34B to the second end 24B of the steering valve 24. The steering valve 24 moves to cause steering fluid from the steering fluid supply line 22 to flow into the second steering cylinder 28B, and to allow steering fluid from the first steering cylinder 28A to flow into the steering fluid drain line 42, and thereby allow the wheels to turn the second direction B. As with the redundant control circuit 16, the line connecting the thermal bleed of the primary pilot valve 56 to the pilot fluid drain line 60 may be routed past the primary proportional control valves 64A, 64B so that the pilot fluid elevates the temperatures of the valves 64A, 64B when they are not operating. Alternative embodiments are also contemplated wherein an additional line or lines having a thermal bleed orifice or orifices the outlet of the primary pilot valve 56 to the pilot fluid drain line 60 allow steering fluid to flow past the valves 64A, 64B when the primary pilot valve 56 is in the open position warm the valves 64A, 64B when they are not operating to turn the wheels of the machine.

As the wheels turn, the ECM 90 continually receive sensor signals from the spool position sensor 36, wheel position sensor 102 and steering input sensor 100, and compares the current position of the wheels to the position commanded by the operator of the machine. As the current position of the wheels approaches the commanded position, the rate of turning the wheels can be reduced proportionately so that the wheels do not stop abruptly when the wheels arrive at the commanded position. Therefore, as the difference between the current position of the wheels and the commanded position decreases, the ECM 90 updates the control signals transmitted to the appropriate one of the valve actuators 66A, 66B to cause the corresponding primary proportional control valve 64A, 64B to move toward the closed position and decrease the output flow of pilot fluid. As the pressure of pilot fluid decreases, the steering valve 24 moves toward the neutral position and decreases the flow of steering fluid to the corresponding steering cylinder 28A, 28B to slow the turning of the wheels. Throughout these operations of the primary control circuit 14, an amount of steering fluid continuously flows through the PRV 72 to maintain a fresh supply of warm steering fluid that functions as the pilot fluid when the redundant control circuit 16 controls the operation of the steering circuit 12.

As the steering control system 10 operates under the control of the primary control circuit 14, the ECM 90 monitors the performance of the steering circuit 12 relative to the steering commands from the operator. For example, the ECM 90 may compare the actual position of the wheels to the commanded position and determined that a problem exist in the steering control system 10 if the wheels are turning at a faster or a slower rate than expected based on the control signals transmitted to the valve actuators 66A, 66B. Alternatively, the ECM 90 may compare the position of the steering valve 24 indicated by the sensor signals transmitted by the spool position sensor 36 to an expected position of the steering valve 24 based on the control signals to the valve actuators 66A, 66B. Other methods or combinations of error detection methods may be used to determine that the primary control circuit 14 is not correctly controlling the operation of the steering circuit 12. Detection of errors by the primary control circuit 14 may cause the ECM 90 to transfer control over the steering circuit 12 to the redundant control circuit 16. Alternatively or in addition, a manual override control may be provided to allow an operator or maintenance worker of the machine to command the ECM 90 to control the steering circuit 12 with the redundant control circuit 16.

Once control is switched to the redundant control circuit 16, the redundant control circuit 16 operates in a substantially similar manner as the primary control circuit 14 to cause the steering circuit 12 to turn the wheels in either direction A, B. The PRV 72 operates independently of the ECM 90 to provide a constant supply of steering fluid to the redundant proportional control valves 78A, 78B when the main pump is supplying steering fluid to the steering circuit 12. The thermal bleed for the PRV 72 improves the performance of the steering control system 10 at cutover to the redundant control circuit 16 due to the warm steering fluid circulating through the PRV 72. When the operator manipulates the steering controls to turn the wheels in the first direction A, for example, and the steering input sensor 100 communicates steering input control signals to the ECM 90, the ECM 90 determines the amount of steering fluid flow necessary to turn the wheels, the ECM 90 transmits control signals to the valve actuator 80A of the redundant proportional control valve 78A to open the valve 78A and cause an output pressure of steering fluid that is proportional to the amount of turn in the first direction A. As the valve 78A opens, pilot fluid is communicated over the steering fluid supply line 82A to the resolver shuttle valve 34A. The steering fluid causes the resolver shuttle valve 34A to open to a position that places the steering fluid supply line 82A in fluid communication with the first end 24A of the steering valve 24. The steering fluid causes the steering valve 24 to move and place the steering fluid supply line 22 in fluid communication with the first steering cylinder 28A and the second steering cylinder 28B in fluid communication with steering fluid drain line 42 to turn the wheels in the first direction A. When a wheel turn in the second direction B is commanded, the ECM 90 transmits control signals causing the redundant proportional control valve 78B to provide steering fluid causing the steering valve 24 to move in the direction to cause the wheels to turn in the second direction B.

The steering control system 10 as described herein provides improvements over previous systems such as those described above in regards to performance, particularly at startup, reduction in maintenance, and efficiency in the packaging of the steering control system 10. The thermal bleeds provided in both the primary control circuit 14 and the redundant control circuit 16 reduce resistance to fluid flow through the circuits 14, 16 and into the steering circuit 12 to optimize the responsiveness of the steering control system 10 to operator steering commands after cold starts and at the time steering control is transferred to the redundant control circuit 16. Integration of all three circuits 12, 14, 16 into a single valve group within the single valve group housing 110 reduces the number of potential leak points that can cause degradation in the performance of the steering control system 10 and require the machine to be taken out of service for maintenance and corresponding reduction in the machine owner's return on their investment in the machine. The single valve group housing 110 also reduces the overall weight of the steering control system 10 and the space claim of the system 10 within the machine by providing more efficient packaging of the components of the steering control system 10. The reduced weight may improve the efficiency of the power plant of the machine to propel the machine during operation. The reduced space claim frees up space within the machine for other components and systems of the machine, and can potentially allow for a reduction in the space requirements and overall size of the machine in which the steering control system 10 is implemented.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A steering control system for a machine having steering components configured to turn in a first direction and a second direction, a steering actuator operatively coupled to the steering components to turn in the first direction and the second direction, a steering input device, a steering fluid source and a pilot fluid source, the steering control system comprising:
  a steering circuit comprising a steering valve in fluid communication with the steering fluid source and movable between a closed position, a first open position wherein the steering valve outputs steering fluid to the steering actuator to cause the steering components to turn in the first direction, and a second open position wherein the steering valve outputs steering fluid to the steering actuator to cause the steering components to turn in the second direction;
  a primary control circuit in fluid communication with the steering circuit and configured to transmit pilot fluid to the steering valve to cause the steering valve to move between the closed position, the first open position and the second open position, the primary control circuit comprising a primary pilot valve in fluid communication with the pilot fluid source and movable between a closed position that prevents transmission of pilot fluid to the steering circuit and an open position that allows transmission of pilot fluid to the steering circuit, wherein the primary pilot valve includes a primary thermal bleed path allowing pilot fluid to flow through the primary pilot valve and output to a pilot fluid drain line when the primary pilot valve is in the closed position.

2. The steering control system of claim 1, wherein the primary thermal bleed path allows pilot fluid to flow through the primary pilot valve and output to the pilot fluid drain line when the primary pilot valve is in the open position.

3. The steering control system of claim 1, wherein the primary control circuit comprises:
  a first primary proportional control valve having an inlet in fluid communication with an outlet of the primary pilot valve and an outlet in fluid communication with a first end of the steering valve, wherein pilot fluid output by the first primary proportional valve biases the steering valve to move in the direction of the first open position; and
  a second primary proportional control valve having an inlet in fluid communication with the outlet of the primary pilot valve and an outlet in fluid communication with a second end of the steering valve, wherein pilot fluid output by the second primary proportional valve biases the steering valve to move in the direction of the second open position.

4. The steering control system of claim 1, comprising a redundant control circuit in fluid communication with the steering circuit and configured to transmit steering fluid to the steering valve to cause the steering valve to move between the closed position, the first open position and the second open position, the redundant control circuit comprising a pressure reducing valve in fluid communication with the steering fluid source and configured to move between an open position and a closed position to maintain a predetermined pressure at an outlet of the pressure reducing valve, wherein the redundant control circuit includes a redundant thermal bleed path allowing steering fluid to flow through the pressure reducing valve and output to a steering fluid drain line when the pressure reducing valve is not in the closed position.

5. The steering control system of claim 4, wherein the redundant thermal bleed path comprises a thermal bleed orifice placing the outlet of the pressure reducing valve in fluid communication with the steering fluid drain line.

6. The steering control system of claim 4, comprising a valve group housing enclosing the components of the steering circuit, the primary control circuit and the redundant control circuit, wherein the valve group housing includes interior surfaces defining passages therein for communicating pilot fluid and steering fluid between the components of the steering circuit, the primary control circuit and the redundant control circuit.

7. The steering control system of claim 6, wherein the steering circuit comprises a priority valve having an inlet in fluid communication with the steering fluid source and an outlet in fluid communication with the steering valve, and wherein the valve group housing comprises:
  a primary housing portion enclosing the components of the primary control circuit and the steering valve of the steering circuit; and
  a redundant housing portion enclosing the components of the redundant control circuit and the priority valve of the steering circuit.

8. A steering control system for a machine having steering components configured to turn in a first direction and a second direction, a steering actuator operatively coupled to the steering components to turn in the first direction and the second direction, a steering input device, a steering fluid source and a pilot fluid source, the steering control system comprising:
  a steering circuit in fluid communication with the steering fluid source and operable to one of prevent steering fluid from the steering fluid source from being transmitted to the steering actuator, output steering fluid to the steering actuator to cause the steering components to turn in the first direction, and output steering fluid to the steering actuator to cause the steering components to turn in the second direction;
  a primary control circuit in fluid communication with the pilot fluid source and operable to one of prevent pilot fluid from the pilot fluid source from being transmitted to the steering circuit, output pilot fluid to the steering circuit to cause the steering circuit to output steering fluid to the steering actuator to cause the steering components to turn in the first direction, and output pilot fluid to the steering circuit to cause the steering circuit to output steering fluid to the steering actuator to cause the steering components to turn in the second direction;
  a redundant control circuit in fluid communication with the steering fluid source and operable to one of prevent steering fluid from the steering fluid source from being transmitted to the steering circuit, output steering fluid to the steering circuit to cause the steering circuit to output steering fluid to the steering actuator to cause the steering components to turn in the first direction, and output steering fluid to the steering circuit to cause the steering circuit to output steering fluid to the steering actuator to cause the steering components to turn in the second direction; and
  a valve group housing enclosing the steering circuit, the primary control circuit and the redundant control circuit, wherein the valve group housing includes interior surfaces defining passages therein for communicating pilot fluid and steering fluid between the steering circuit, the primary control circuit and the redundant control circuit.

9. The steering control system of claim 8, wherein the valve group housing comprises:
  a primary housing portion enclosing the primary control circuit and a first portion of the steering circuit; and
  a redundant housing portion enclosing the redundant control circuit and a second portion of the steering circuit.

10. The steering control system of claim 9, wherein the steering circuit comprises:
  a steering valve in fluid communication with the steering fluid source and movable between a closed position, a first open position wherein the steering valve outputs steering fluid to the steering actuator to cause the steering components to turn in the first direction, and a second open position wherein the steering valve outputs steering fluid to the steering actuator to cause the steering components to turn in the second direction, wherein the steering valve is in the first portion of the steering circuit and enclosed in the primary housing portion of the valve group housing; and a priority valve having an inlet in fluid communication with the steering fluid source and an outlet in fluid communication with the steering valve, wherein the priority valve is in the second portion of the steering circuit and enclosed in the redundant housing portion of the valve group housing.

11. The steering control system of claim 9, wherein the valve group housing comprises an intermediate housing portion having interior surfaces defining passages for flow of steering fluid and pilot fluid between the primary housing portion and the redundant housing portion.

12. The steering control system of claim 8, wherein the primary control circuit comprises a primary pilot valve in fluid communication with the pilot fluid source and movable between a closed position that prevents transmission of pilot fluid to the steering circuit and an open position that allows transmission of pilot fluid to the steering circuit, wherein the primary pilot valve includes a primary thermal bleed path allowing pilot fluid to flow through the primary pilot valve and output to a pilot fluid drain line when the primary pilot valve is in the closed position.

13. The steering control system of claim 12, wherein the primary thermal bleed path allows pilot fluid to flow through the primary pilot valve and output to the pilot fluid drain line when the primary pilot valve is in the open position.

14. The steering control system of claim 8, wherein the redundant control circuit comprises a pressure reducing valve in fluid communication with the steering fluid source and configured to move between an open position and a closed position to maintain a predetermined fluid pressure at an outlet of the pressure reducing valve, wherein the redundant control circuit includes a redundant thermal bleed path allowing steering fluid to flow through the pressure reducing valve and output to a steering fluid drain line when the pressure reducing valve is not in the closed position.

15. In a steering control system for a machine having a steering circuit in fluid communication with a steering fluid source and operable to output steering fluid to a steering actuator of the machine to cause steering components of the machine to turn in first and second directions, a primary control circuit in fluid communication with a pilot fluid source and operable to output pilot fluid to the steering circuit to cause the steering circuit to output steering fluid to the steering actuator to cause the steering components to turn in the first direction and the second direction, and a redundant control circuit in fluid communication with the steering fluid source and operable to output steering fluid to the steering circuit to cause the steering circuit to output steering fluid to the steering actuator to cause the steering components to turn in the first direction and the second direction, the improvement comprising:

a valve group housing enclosing the steering circuit, the primary control circuit and the redundant control circuit, wherein the valve group housing includes interior surfaces defining passages therein for communicating pilot fluid and steering fluid between the steering circuit, the primary control circuit and the redundant control circuit.

16. The steering control system of claim 15, wherein the valve group housing comprises:

a primary housing portion enclosing the primary control circuit and a first portion of the steering circuit; and a redundant housing portion enclosing the redundant control circuit and a second portion of the steering circuit.

17. The steering control system of claim 16, wherein the valve group housing comprises an intermediate housing portion having interior surfaces defining passages for flow of steering fluid and pilot fluid between the primary housing portion and the redundant housing portion.

18. The steering control system of claim 16, wherein the primary housing portion includes a pilot fluid supply port for receiving pilot fluid from the pilot fluid source to the primary control circuit, a first steering fluid outlet port for output steering fluid from the steering circuit to the steering actuator to cause the steering components to turn in the first direction, and a second steering fluid outlet port for output steering fluid from the steering circuit to the steering actuator to cause the steering components to turn in the second direction.

19. The steering control system of claim 16, wherein the redundant housing portion includes a steering fluid supply port for receiving steering fluid from the steering fluid source to the steering circuit, a steering fluid drain port for draining steering fluid to a steering fluid tank, and a pilot fluid drain port for draining pilot fluid from the primary control circuit.

* * * * *